Jan. 23, 1968   R. W. ARMSTRONG   3,364,748

ALTITUDE INDICATING APPARATUS

Filed March 15, 1965

INVENTOR.
ROBERT W. ARMSTRONG
BY

United States Patent Office 3,364,748
Patented Jan. 23, 1968

3,364,748
ALTITUDE INDICATING APPARATUS
Robert W. Armstrong, Mound, Minn., assignor to Honeywell Inc., a corporation of Delaware
Filed Mar. 15, 1965, Ser. No. 439,670
4 Claims. (Cl. 73—386)

ABSTRACT OF THE DISCLOSURE

An arrangement for giving simultaneous accuracy and reliability in aircraft altitude indicators by providing a first, highly reliable instrument which is not capable of high accuracy, a second, highly accurate instrument which is not so reliable as the first instrument, and apparatus for simultaneously indicating the outputs of both instruments in such a manner that it is at once apparent when the two outputs differ by more than a predetermined amount, whereupon reliance can be transferred from the first output, normally relied on, to the second output.

---

Figure 1:
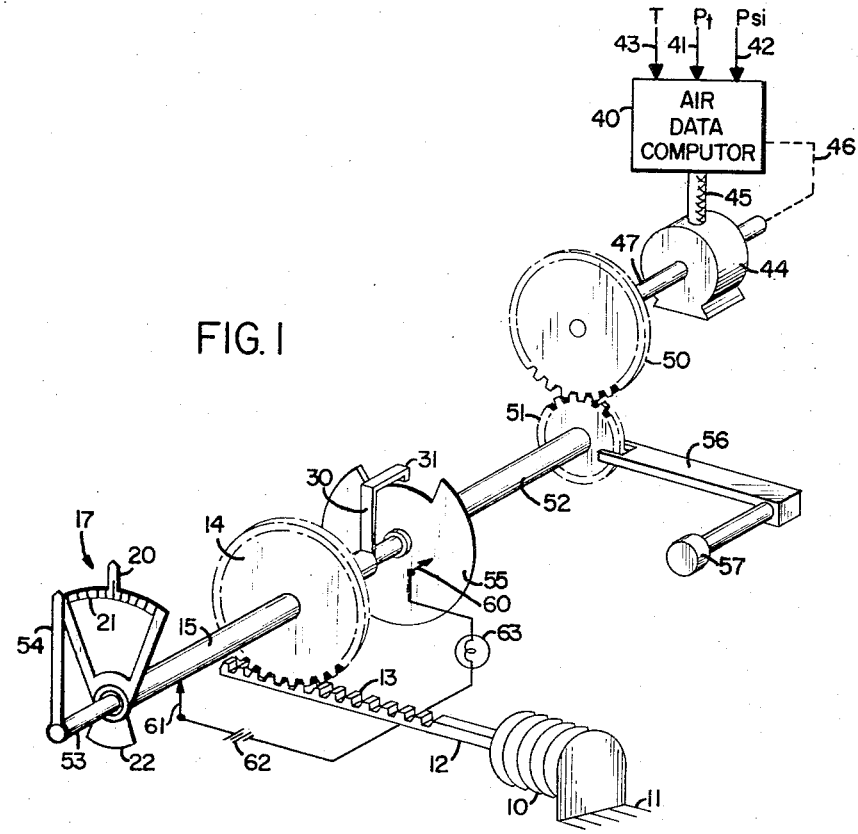

This invention relates to the field of aircraft instruments, and more particularly to altitude indicating apparatus for use in aircraft.

Two principal types of altitude indicating apparatus are known. The earlier historically is the simple bellows type of instrument, in which a sealed resilient bellows or aneroid capsule is subjected externally to the ambient pressure, and dimensional changes in the bellows corresponding to changes in ambient pressure are transmitted to suitable indicating mechanism. Altimeters of this sort are extremely reliable and have been in use for many years. They do, however, suffer from the defect that they cannot be read with very great accuracy, particularly when designed to operate over a considerable range of altitude.

The second type of altitude indicating apparatus is known as an air data computer. Such computers are relatively complex electromechanical devices which receive ram pressure and indicate static pressure inputs from the pitot-static head, as well as other inputs such as ambient temperature, and compute therefrom a number of flight parameters including altitude. Air data computers are very accurate, being readable within an accuracy of only a few feet at altitudes of six miles or better. However, because of their much greater complexity they are considerably less reliable, and moreover they may fail in such a manner as to continue giving a formerly correct reading after the altitude has in fact changed. Aeronauts are thus reluctant to rely solely on air data computers for supervision of the altitude of their aircraft.

The custom has arisen of equipping an aircraft with both a pressure altimeter and an air data computer and indicator. The readings of two instruments will ordinarily differ, but as long as the difference remains within the known uncertainty of the pressure altimeter, the pilot relies on the air data computer. If the difference becomes excessive, the pilot assumes failure of the air data computer and relies on the pressure altimeter, allowing as best he can for its lesser accuracy.

The foregoing procedure results in the appearance of two instruments on the panel observed by the pilot, which he must observe in succession and the readings of which he must coordinate mentally. I have invented a single new instrument replacing the two independent instruments and designed to facilitate the pilot's coordination of the two altitude indicators, as well as giving a warning automatically if the difference between the readings exceeds a predetermined value. A broad object of my invention is therefore to provide improved altitude indicating apparatus for aircraft.

More generally the object of this invention is to provide a single instrument for giving indipendent indications of the outputs of a pair of independent devices responsive to a common variable. Further objects of the invention are to provide means conveniently displaying the difference between the outputs of a pair of devices responsive to a common variable, and to provide means giving an automatic warning whenever the difference exceeds a predetermined value.

Various other objects, advantages, and features of novelty, not individually enumerated above, which characterize my invention are pointed out with particularity in the claims annexed hereto and forming a part hereof. However, for a better understanding of the invention, its advantages and objects attained by its use, reference should be had to subjoined drawing, which forms a further part hereof, and to the accompanying descriptive matter, in which I have illustrated and described a preferred embodiment of my invention.

Figure 2:
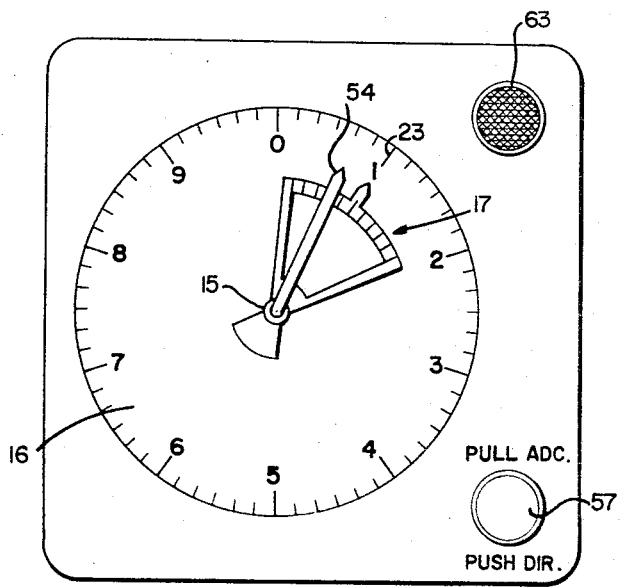

In the drawing, FIGURE 1 is a schematic showing of my invention and FIGURE 2 is a face view of an instrument according to the invention.

Reference numeral 10 in FIGURE 1 identifies an aneroid capsule which conventionally is evacuated and contains a compressed spring. One end of the capsule 10 is secured to a fixed portion of the instrument, as indicated at 11; the other end carries a rod 12 having its remote end cut to comprise a rack 13. Capsule 10 is subjected to the air pressure ambient to the aircraft and expands and contracts in the horizontal direction as the air pressure decreases and increases, thereby causing rack 13 to rotate a gear 14 with which it is meshed. Gear 14 is carried on a hollow shaft 15 which as is also shown in FIGURE 2, projects through the face 16 of the instrument and carries on its outer end an index 17 including a pointer 20, an arcuate scale 21, and a counter weight 22. Face 16 carries a scale 23 with respect to which pointer of index 17 can be read, and the graduations on scale 23 correspond angularly with those on scale 21.

Shaft 15 carries on its inner end a contact arm 30 which is electrically connected thereto, and suitable means such as wiper 31 is provided to make electrical connection with the shaft. It is evident that as the ambient pressure varies the movement of capsule 10 is transmitted through members 12, 13, 14, 15 and becomes evident as movement of index 17 with respect to scale 23.

An air data computer 40 is shown schematically in FIGURE 1 as receiving inputs 41, 42, 43 representative of $P_t$, the ram pressure, $P_{st}$, the indicated static pressure, and T the ambient temperature, and as operating a servo motor 44 through a cable 45 to a position determined by the aircraft altitude computed from the inputs, the servo loop being completed through a suitable feedback connection 46. Motor shaft 47 acts through gears 50 and 51 to drive a shaft 52 having an extension 53 which passes through hollow shaft 15. A second index 54 in the form of a simple pointer is carried on the end of extension 53 for movement with respect to scale 21 and scale 23. A contact disk 55 having a cutaway section is mounted on shaft 52 and electrically insulated therefrom.

Shaft 52 is mounted for rotation in any suitable bearing means, not shown, and is also capable of a small amount of axial displacement. Suitable means are provided for positioning shaft 52 axially, being shown as a yoke member 56 straddling gear 51 and manually actuable by means of knob 57 to move the yoke member and hence gear 51 and shaft 52. The amount of displacement required is not large, and the face of one of gears 50 and 51 is sufficiently broad to permit this movement without allowing the gears to be disengaged.

When knob 57 is pulled toward the observer, disk 55 is moved into a position in which its perimeter can be engaged by wiper 31, if the two members are at an appropriate angular relationship. When knob 57 is pushed in, disk 55 is displaced so that it cannot engage wiper 31 regardless of the angular displacement of either.

A first brush 60 is arranged for continuous electrical engagement with disk 55, and a second brush 61 is arranged for continuous electrical engagement with shaft 15 and hence with wiper 31. Connected serially between wipers 60 and 61 are a source of electrical energy, shown as battery 62, and an indicating device shown in the form of pilot light 63.

The apparatus is set so that with both the capsule and the air data computer in satisfactory operation and with knob 57 pushed in, pointer 54 and pointer 20 move properly with respect to scale 23 as the aircraft altitude changes. Absolute coincidence between the two pointers will not ordinarily be expected, but pointer 54 should not be displaced from pointer 20 by more than half the total extent of scale 21. When this adjustment is achieved, knob 57 may be pulled out. The human pilot now guides himself by pointer 54 as the more accurate of the two. As long as computer 40 is in the proper operation shafts 15 and 52 are so operated that wiper 31 cannot engage disk 55. However, should computer 40 fail, so that index 54 remains motionless, subsequent change of altitude of the aircraft causes rotation of wiper 31 while disk 55 remains stationary, and presently the wiper electrically engages the disk, completing a circuit for illuminating lamp 63 to give warning of computer failure. The pilot now pushes the knob 57 and guides himself by pointer 20, ignoring the reading of pointer 54 which may be widely different. If automatic craft control from the air data computer is in process, this also should be interrupted.

Numerous objects and advantages of my invention have been set forth in the foregoing description, together with details of the structure and function of the invention, and the novel features thereof are pointed out in the appended claims. The disclosure, however, is illustrative only and I may make changes in detail, especially in matters of shape, size, and arrangement of parts, within the principle of the invention, to the full extent indicated by the broad general terms in which the appended claims are expressed.

I claim as my invention:

1. In combination: a scale having a set of graduations arranged along a line thereon; reliable means of limited accuracy giving a first output representative of only a single parameter; accurate means of limited reliability giving a second output also representative of only said single parameter; a first index movable with respect to said scale; a second index independently movable with respect to said scale and having a pointer of substantial extent adjacent to said scale, said pointer bearing graduations commensurate with those of said scale; and means connecting first and second indices for actuation by said outputs, so that the reliability of said accurate means may be visually verified.

2. In combination: a fixed scale having graduations; a second scale having graduations commensurate with the graduations of said first scale, and having a first index; means mounting said second scale for unitary movement along said fixed scale; a second index; means mounting said second index for independent movement along said fixed scale and said second scale; and separate means independently responsive to only a single parameter for severally causing operation of said second index and said second scale.

3. In combination: a fixed scale having graduations; a second scale having graduations commensurate with the graduations of said first scale, and having a first index; means mounting said second scale for unitary movement along said fixed scale; a second index; means mounting said second index for independent movement along said fixed scale and said second scale; and signal means responsive to extreme divergence between the indications of said first index and said second index on said fixed scale.

4. In combination: a pressure altimeter giving a reliable output of limited accuracy, representative of altitude; an air data computer giving accurate output of limited reliability representative of altitude; a fixed scale graduated in predetermined units of altitude along a predetermined line; a first index including a portion aligned with said fixed scale and graduated in said units and a portion extending therefrom to overlie said fixed scale; means mounting said first index for movement along said predetermined line; means connecting said first index for actuation by said pressure altimeter; a second index; means mounting said second index for independent movement with respect to said fixed scale; and means connecting said second index for actuation by said air data computer output.

References Cited

UNITED STATES PATENTS

| | | | |
|---|---|---|---|
| 1,476,799 | 12/1923 | Comfort | 73—338.3 XR |
| 3,033,035 | 5/1962 | Snodgrass | 116—129 XR |
| 3,150,525 | 9/1964 | Berger | 73—407 |

LOUIS R. PRINCE, *Primary Examiner.*

D. O. WOODIEL, *Assistant Examiner.*